(12) United States Patent
Sato et al.

(10) Patent No.: US 8,037,702 B2
(45) Date of Patent: Oct. 18, 2011

(54) MULTISTAGE COMPRESSOR

(75) Inventors: Hajime Sato, Aichi-ken (JP); Yoshiyuki Kimata, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 932 days.

(21) Appl. No.: 12/010,784

(22) Filed: Jan. 30, 2008

(65) Prior Publication Data
US 2008/0184723 A1 Aug. 7, 2008

(30) Foreign Application Priority Data

Feb. 2, 2007 (JP) ................................ 2007-024086

(51) Int. Cl.
*F25B 1/00* (2006.01)
*F25B 49/00* (2006.01)
*F25B 1/10* (2006.01)
*F04B 49/06* (2006.01)
(52) U.S. Cl. ........ 62/228.1; 62/228.3; 62/510; 417/44.2
(58) Field of Classification Search ............... 62/175, 62/228.1, 228.3, 510, 513, 498; 417/417, 417/44.2
See application file for complete search history.

(56) References Cited

U.S. PATENT DOCUMENTS

| 4,475,360 | A | 10/1984 | Suefuji et al. |
| 7,213,405 | B2 * | 5/2007 | Shapiro ........................ 62/228.3 |
| 2006/0037336 | A1 | 2/2006 | Bush |

FOREIGN PATENT DOCUMENTS

| EP | 1722173 | A2 | 11/2006 |
| JP | 5-87074 | A | 4/1993 |
| JP | 2000-54975 | A | 2/2000 |
| JP | 2001-73976 | A | 3/2001 |
| JP | 2003-13860 | A | 1/2003 |
| JP | 2006-152839 | A | 6/2006 |
| WO | WO 2007/094618 | A2 | 8/2007 |

OTHER PUBLICATIONS

European Search Report dated May 28, 2008, issued in corresponding European Patent Application No. 08150899.6.

\* cited by examiner

*Primary Examiner* — Chen Wen Jiang
(74) *Attorney, Agent, or Firm* — Westerman, Hattori, Daniels & Adrian, LLP

(57) ABSTRACT

To provide a multistage compressor including an injection circuit, which can continue high-efficiency and high-capacity operations even if the injection circuit is turned on/off in accordance with operating conditions. A multistage compressor includes a high stage side compressing mechanism suctioning the intermediate pressure refrigerant gas compressed with a low stage side compressing mechanism to perform two-stage compression, and an injection circuit for injecting an intermediate pressure refrigerant into the intermediate pressure refrigerant gas suctioned to the high stage side compressing mechanism, the high stage side compressing mechanism including a capacity control mechanism for bypassing a refrigerant gas that is being compressed to a suction side, the injection circuit including an on/off mechanism for performing on/off control of refrigerant injection, and the capacity control mechanism and the on/off mechanism being operated in conjunction with each other.

8 Claims, 4 Drawing Sheets

FIG. 3

|  | CAPACITY CONTROL | INJECTION |
|---|---|---|
| STARTUP | ON | OFF |
| SHIFTING | ON | ON |
| FULL LOAD | OFF | ON |

MULTISTAGE COMPRESSOR

BACKGROUND OF THE INVENTION

1. Field of the Invention

The present invention relates to a multistage compressor having a low stage side compressing mechanism and a high stage side compressing mechanism incorporated in a housing.

This application is based on Japanese Patent Application No. 2007-024086, the content of which is incorporated herein by reference.

2. Description of Related Art

Hitherto, various types of multistage compressors used in an air conditioner have been proposed. To give an example thereof, there has been known a multistage compressor that includes a low stage side rotary compressing mechanism below an electric motor provided at the center of a closed housing and functions to inject a gas compressed with the mechanism into the closed housing to supply the gas as an intermediate pressure gas to a high stage side scroll compressing mechanism provided above the electric motor to compress the gas in two stages (see Japanese Unexamined Patent Application Publication No. 5-87074, for instance).

Further, Japanese Unexamined Patent Application Publication No. 2000-54975 discloses a multistage compressor that includes electric motor, low stage side and high stage side rotary compressing mechanisms provided in a closed housing and functions to inject an intermediate pressure gas compressed with the low stage side rotary compressing mechanism to a second sealed chamber provided in the closed housing as well as inject an intermediate pressure gas extracted from a refrigerant circuit side to the second sealed chamber to supply the intermediate pressure injection gas and the intermediate gas compressed with the low stage side rotary compressing mechanism to the high stage side rotary compressing mechanism to compress the gases in two stages.

Further, Japanese Unexamined Patent Application Publication No. 2006-152839 discloses a multistage compressor that uses an R410A refrigerant to supply an intermediate gas compressed with a low stage side rotary compressing element to a high stage side rotary compressing element through a gas pipe and in addition, inject an intermediate gas extracted from a refrigerant circuit side to the gas pipe to compress the gases in two stages. In this compressor, a displacement volume ratio between the low stage side compressing element and the high stage side compressing element is 1:0.65 to 1:0.85.

Furthermore, Japanese Unexamined Patent Application Publication No. 2001-73976 discloses a multistage compressor that injects a part of a $CO_2$ refrigerant gas compressed with a low stage side rotary compressing element to a closed housing and supplies the intermediate pressure $CO_2$ refrigerant gas and the remaining intermediate pressure $CO_2$ refrigerant gas to a high stage side rotary compressing element through a gas pipe to compress the gases in two stages. In this compressor, a capacity ratio between the low stage side compressing element and the high stage side compressing element is 1:0.56 to 1:0.8.

The above two-stage compressors provided with the gas injection circuit as disclosed in Japanese Unexamined Patent Application Publication Nos. 2000-54975 and 2006-152839 can enhance efficiency and capacity of the two-stage compressor owing to an economizer effect of gas injection. However, during a mild-weather season with a low air-conditioning load, the spring or autumn, a high capacity is not necessarily required. To that end, an on/off valve may be provided to a gas injection circuit and closed to turn off the gas injection circuit if an applied load is low. In this case, as in the two-stage compressors as disclosed in Japanese Unexamined Patent Application Publication Nos. 5-87074 and 2001-73976, the compressor functions as a two-stage compressor provided with no gas injection circuit.

However, as understood from the above publications, in the two-stage compressor, an optimum compression ratio between a low stage side compressing element and a high stage side compressing element varies depending on whether a gas injection circuit is provided. Therefore, in a two-stage compressor including a gas injection circuit, if an on/off valve is provided to the gas injection circuit turn on/off the gas injection circuit, a compression ratio between a low stage side and a high stage side is changed, and a preset optimum compression ratio is lost to decrease efficiency and capacity.

This phenomenon might occur also in the case of using a liquid injection circuit that injects an intermediate pressure liquid refrigerant in place of the gas injection circuit.

BRIEF SUMMARY OF THE INVENTION

The present invention has been accomplished in view of the above circumstances and it is accordingly an object of the present invention to provide a multistage compressor that includes an injection circuit and can continue high-efficiency and high-capacity operations even if the injection circuit is tuned on/off depending on an operation condition.

To attain the above object, a multistage compressor according to the present invention employs the following means.

That is, a multistage compressor according to the present invention includes: a low stage side compressing mechanism and a high stage side compressing mechanism provided in a housing with the low stage side compressing mechanism compressing an intermediate pressure refrigerant gas and the high stage side compressing mechanism suctioning the compressed intermediate pressure refrigerant gas to perform two-stage compression; and an injection circuit for injecting an intermediate pressure refrigerant extracted from a refrigerant circuit into the intermediate pressure refrigerant gas suctioned to the high stage side compressing mechanism, the high stage side compressing mechanism including a capacity control mechanism for bypassing a refrigerant gas that is being compressed to a suction side, the injection circuit including an on/off mechanism for performing on/off control of refrigerant injection, and the capacity control mechanism and the on/off mechanism being operated in conjunction with each other.

In the multistage compressor including an injection circuit, in order to maximize effects of multistage compression and refrigerant injection (high efficiency and high capacity), a compression ratio of the low stage side compressing mechanism and the high stage side compressing mechanism is set to an optimum value. On the other hand, during a mild-weather season, the spring or autumn, a high capacity is not necessarily required. Thus, refrigerant injection can be omitted in some cases. To that end, if the refrigerant injection is unnecessary, the injection circuit is provided with an on/off mechanism to cancel the refrigerant injection. However, if the injection circuit is turned off, a capacity corresponding to a refrigerant injection amount is not used in the high stage side compressing mechanism. Thus, although a compression ratio is set to an optimum value, the optimum value is useless, resulting in reduction in performance.

According to the present invention, the high stage side compressing mechanism is provided with a capacity control mechanism, and the capacity control mechanism and the on/off mechanism of the injection circuit are operated in conjunction with each other. Therefore, the capacity control mechanism can change apparent displacement volume of the high stage side compressing mechanism in accordance with an on/off condition of refrigerant injection to adjust a compression ratio of each stage to keep an appropriate intermediate pressure. Accordingly, even if the injection circuit is turned on/off in accordance with operating conditions, the optimum compression ratio is not changed and high-efficiency operation can be continued.

A refrigerant injection system of the present invention includes a gas injection system for injecting an intermediate pressure gas refrigerant and a liquid injection system for injecting an intermediate pressure liquid refrigerant. Each system can be realized by providing an injection circuit for extracting an intermediate pressure gas refrigerant or liquid refrigerant from the refrigerant circuit to inject the refrigerant to the multistage compressor.

Moreover, in the multistage compressor of the present invention, when the on/off mechanism turns off the injection circuit, the capacity control mechanism may control a capacity of the high stage side compressing mechanism.

With this structure, when the on/off mechanism turns off the injection circuit, the capacity control mechanism controls a capacity of the high stage side compressing mechanism, so the injection circuit is turned off, and apparent displacement volume of the high stage side compressing mechanism is reduced by a predetermined amount corresponding to an uninjected refrigerant. Hence, an optimum compression ratio is kept and a high-performance operation can be continued.

Further, in the multistage compressor of the present invention, a capacity control rate of the capacity control mechanism at least under a condition that the on/off mechanism turns off the injection circuit may be set to correspond to pressure ratio distribution obtained when the injection circuit is turned on with a full capacity.

With this structure, a capacity control rate of the capacity control mechanism at least under a condition that the on/off mechanism turns off the injection circuit is set to correspond to pressure ratio distribution (ratio between a pressure ratio on a low stage side and a pressure ratio on a high stage side) obtained when the injection circuit is turned on with a full capacity. Thus, a ratio between a compression ratio of the low stage side compressing mechanism and that of the high stage side compressing mechanism is not changed irrespective of an on/off state of the injection circuit. Hence, efficient two-stage compression can be performed regardless of on/off condition of refrigerant injection.

Further, in the multistage compressor of the present invention, preferably, the capacity control mechanism is forcedly turned on and the injection circuit is forcedly turned off at startup.

With this structure, the capacity control mechanism is forcedly turned on and the injection circuit is forcedly turned off at startup. Hence, the multistage compressor can be started under low-load conditions and a liquid refrigerant accumulated in the compressor during halts can be gradually discharged through capacity control operation. In addition, liquid flowback from the injection circuit can be prevented. Accordingly, the multistage compressor can be protected from an excessive liquid compression operation and enhance its reliability.

Further, in the multistage compressor of the present invention, preferably, after the startup, the capacity control mechanism is turned on and the injection circuit is turned on, and then an operation is shifted to a full-load operation in which the capacity control mechanism is turned off and the injection circuit is turned on.

With this structure, after the startup, the capacity control mechanism is turned on and the injection circuit is turned on, and then an operation is shifted to a full-load operation in which the capacity control mechanism is turned off and the injection circuit is turned on. Thus, the liquid refrigerant accumulated in the compressor is completely discharged, after which the operation can be shifted to a high-efficiency and high-performance two-stage compression operation based on general refrigerant injection. Hence, a liquid compression operation of the multistage compressor can be securely prevented.

Further, in the multistage compressor of the present invention, preferably, during a liquid flowback operation, the capacity control mechanism is forcedly turned on and the injection circuit is forcedly turned off.

With this structure, during a liquid flowback operation, the capacity control mechanism is forcedly turned on and the injection circuit is forcedly turned off. Thus, the multistage compressor can be shifted to a low-capacity and low-power operation. Hence, the liquid flowback operation can be avoided to prevent the multistage compressor from being damaged due to liquid compression.

The liquid flowback operation can be detected by determining how much a suctioned refrigerant is heated in accordance with detected values of a low-pressure sensor and a suctioned refrigerant temperature sensor provided to a suction pipe of a refrigeration cycle.

Further, in the multistage compressor of the present invention, the housing may be an intermediate pressure housing in which an intermediate pressure refrigerant gas compressed with the low stage side compressing mechanism is discharged, an intermediate pressure refrigerant is injected from the injection circuit, and an intermediate pressure refrigerant gas is bypassed from the capacity control mechanism.

With this structure, the housing is an intermediate pressure housing in which an intermediate pressure refrigerant gas compressed with the low stage side compressing mechanism is discharged, an intermediate pressure refrigerant is injected from the injection circuit, and an intermediate pressure refrigerant gas is bypassed from the capacity control mechanism. Thus, even if the injection circuit is turned off, an intermediate pressure refrigerant of a predetermined amount corresponding to the refrigerant amount is bypassed from the capacity control mechanism. Thus, the housing can be kept at an appropriate intermediate pressure. Hence, it is possible to suppress change in intermediate pressure and perform a stable two-stage compression operation.

Further, in the multistage compressor of the present invention, the high stage side compressing mechanism may be a scroll compressing mechanism.

With this structure, the high stage side compressing mechanism is a scroll compressing mechanism. Thus, the capacity control mechanism can be easily incorporated compared with the other compressing mechanism from a structural point of view, and in addition, a lubricating structure can be simplified. Therefore, a multistage compressor including a gas injection circuit can be produced at low costs.

According to the present invention, the capacity control mechanism can change apparent displacement volume of the high stage side compressing mechanism in accordance with an on/off condition of refrigerant injection to adjust a compression ratio of each stage to keep an appropriate intermediate pressure. Thus, even if the injection circuit is turned on/off in accordance with operating conditions, the optimum compression ratio is not changed and high-efficiency and high-capacity operation can be continued.

BRIEF DESCRIPTION OF THE SEVERAL VIEWS OF THE DRAWINGS

FIG. 3 illustrates an operation state of a multistage compressor according to a second embodiment of the present invention.

DETAILED DESCRIPTION OF THE INVENTION

Hereinafter, embodiments of the present invention will be described with reference to the accompanying drawings.

First Embodiment

A first embodiment of the present invention is described below with reference to FIGS. 1 and 2.

Figure 1:
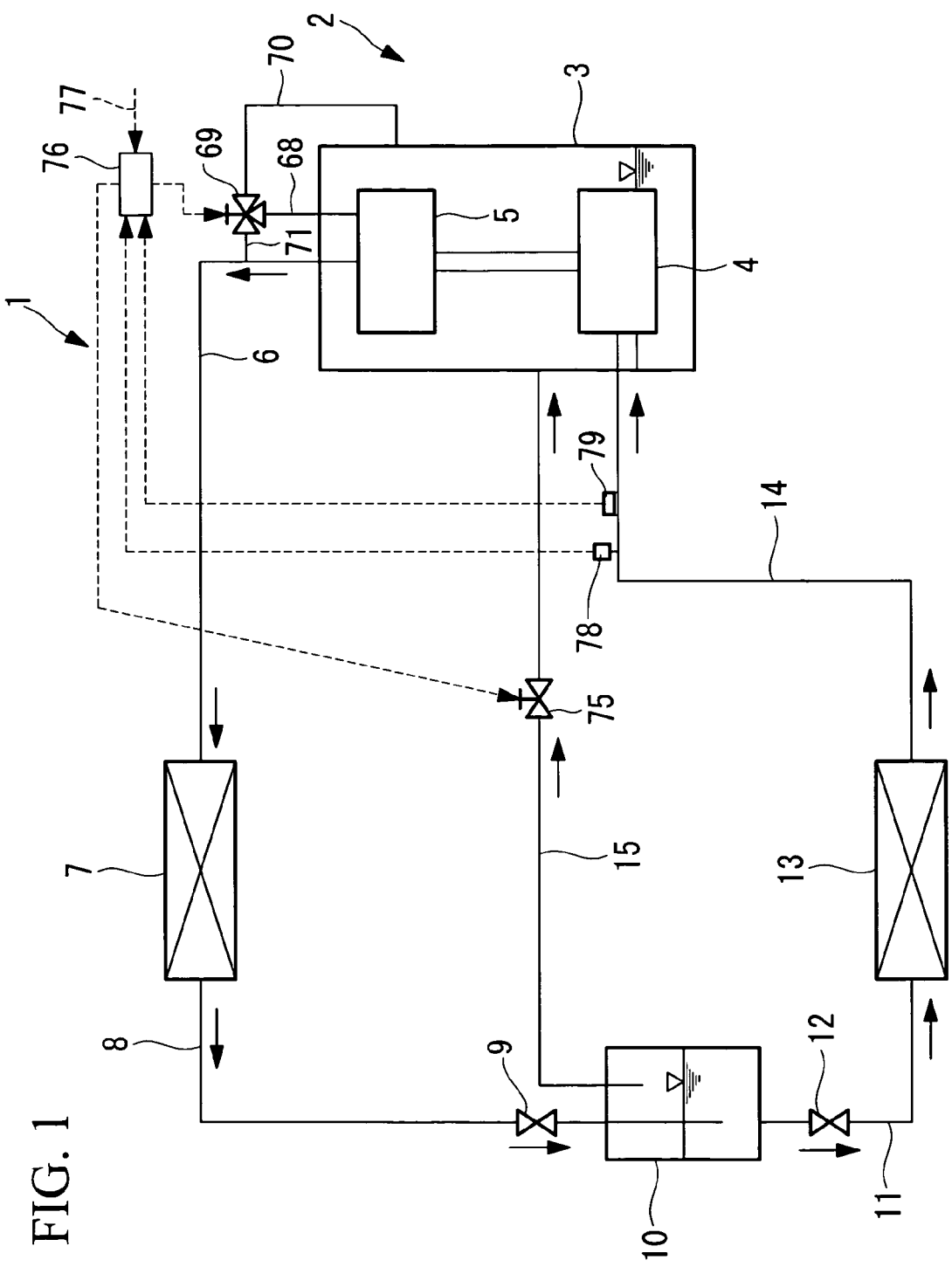
FIG. 1 is a diagram of a refrigeration cycle with a multistage compressor according to a first embodiment of the present invention.
Figure 2:
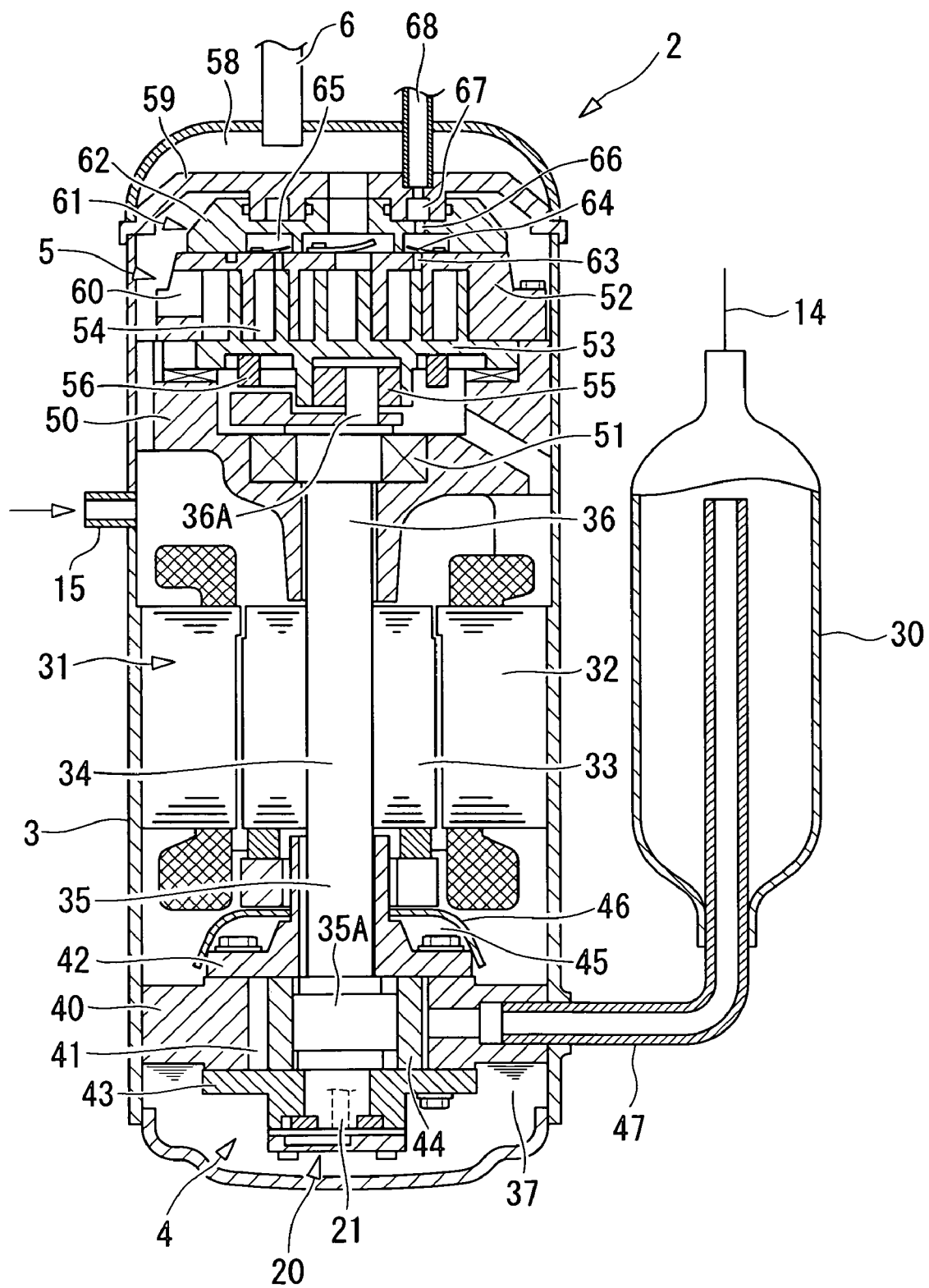
FIG. 2 is a longitudinal sectional view of the multistage compressor according to the first embodiment of the present invention.

FIG. 1 is a diagram of a refrigeration cycle 1 using a multistage compressor 2 according to the first embodiment of the present invention. This embodiment is directed to the case of using a gas injection type one.

The refrigeration cycle 1 includes a multistage compressor 2 provided with two compressing mechanisms, that is, a low stage side compressing mechanism 4 and a high stage side compressing mechanism 5, which are incorporated in a closed housing 3. The structure of the multistage compressor 2 is described later in detail.

The high stage side compressing mechanism 5 of the multistage compressor 2 is connected to one end of a discharge pipe 6, and the other end of the discharge pipe 6 is connected to a radiator 7. A high-temperature and high-pressure refrigerant gas discharged from the multistage compressor 2 is heat-exchanged with an outside air supplied from a radiator fan (not shown) in the radiator 7 and thus cooled. A gas-liquid separator 10 is provided downstream of the radiator 7 through a refrigerant pipe 8 and a first decompression valve 9 to separate a refrigerant decompressed with the first decompression valve 9 into a liquid component and a gas component. An evaporator 13 is connected downstream of the gas-liquid separator 10 through a refrigerant pipe 11 and a second decompression valve 12.

In the evaporator 13, a low-temperature and low-pressure gas-liquid two-phase refrigerant decompressed through the second decompression valve 12 is heat-exchanged with an air supplied from an evaporator fan (not shown) to absorb heat of the air and turn into an evaporating gas. The refrigerant evaporated with the evaporator 13 is guided to the low stage side compressing mechanism 4 of the multistage compressor 2 through a suction pipe 14 provided between the evaporator 13 and the multistage compressor 2.

A gas injection circuit 15 is connected between the gas-liquid separator 10 and the closed housing 3 of the multistage compressor 2. The circuit injects the intermediate pressure refrigerant gas separated with the gas-liquid separator 10 into the closed housing 3.

Next, the structure of the multistage compressor 2 is described with reference to FIG. 2.

In the multistage compressor 2, low stage side compressing mechanism 4 and the high stage side compressing mechanism 5 are provided in a lower portion and an upper portion of the closed housing 3, respectively. As for the multistage compressor 2, a compression ratio between the low stage side compressing mechanism 4 and the high stage side compressing mechanism 5 is optimally set on the presumption that the gas injection circuit 15 injects an intermediate pressure refrigerant gas.

The multistage compressor 2 is integrally provided with an accumulator 30 connected to the suction pipe 14. Further, an electric motor 31 composed of a stator 32 and a rotor 33 is provided at the center of the closed housing 3, and the rotor 33 is integrated with a crank shaft 34. The crank shaft 34 has a lower end used as a crank shaft 35 for the low stage side compressing mechanism 4 and an upper end used as a crank shaft 36 for the high stage side compressing mechanism 5. Moreover, a predetermined amount of lubricating oil 37 is sealed into a bottom portion of the closed housing 3. The lubricating oil 37 is supplied to predetermined portions of the low stage side compressing mechanism 4 and the high stage side compressing mechanism 5 through an oil supply hole formed in an axial direction of the crank shaft 34 by means of a known positive-displacement oil pump 20 provided at the lower end of the crank shaft 34.

The low stage side compressing mechanism 4 is a rotary compressing mechanism. The rotary compressing mechanism 4 may be a general rotary compressing mechanism that includes a cylinder main body 40 including a cylinder chamber 41 and fixed to the closed housing 3, an upper bearing 42 and a lower bearing 43 provided in upper and lower portions of the cylinder main body 40, a rotor 44 fitted to a crank portion 35A of the crank shaft 35 and slidably rotated in the cylinder chamber 41, a discharge cover 46 that defines a discharge cavity 45, and a blade and blade holddown spring (not shown).

In the low stage side rotary compressing mechanism 4, a refrigerant gas suctioned into the cylinder chamber 41 through the suction tube 47 connected to the accumulator 30 is compressed down to an intermediate pressure in accordance with rotation of the rotor 44 and then injected into the discharge cavity 45 and into the closed housing 3 through an discharge port formed in the discharge cover 46.

The intermediate pressure refrigerant gas injected into the closed housing 3 moves to an upper space through an air gap of the electric motor 31 and is then mixed with an intermediate pressure refrigerant gas injected from the gas injection circuit 15 connected to the closed housing 3 into the closed housing 3 and suctioned to the high stage side compressing mechanism 5.

The gas injection circuit 15 is connected to the closed housing 3 between the electric motor 31 and the high stage side compressing mechanism 5.

The high stage side compressing mechanism 5 is a scroll compressing mechanism. The scroll compressing mechanism 5 may be a general scroll compressing mechanism that includes a frame member 50 including a bearing 51 for supporting the crank shaft 36 and fixed to the closed housing 3, a fixed scroll 52 and a orbiting scroll 53 supported onto the frame member 50 and engaged with each other at different phases to form a pair of compression chambers 54, a drive bushing 55 that connects the orbiting scroll 53 and a crank pin 36A provided at the end of the crank shaft 36 and drives the orbiting scroll 53, an Oldham's ring 56 provided between the orbiting scroll 53 and a supporting frame 50 and revolving the orbiting scroll 53 while preventing the scroll 53 from rotating on its axis, a discharge valve 57 provided on the back of the fixed scroll 52, and a discharge cover 59 that is connected on the back of the fixed scroll 52 and defines a discharge chamber 58 with the closed housing 3.

In the high stage side scroll compressing mechanism 5, the discharge chamber 58 is connected to the discharge pipe 6 to discharge a high-temperature and high-pressure compressed refrigerant gas from the compressor.

In the high stage side scroll compressing mechanism 5, an intermediate pressure refrigerant gas compressed down to an intermediate pressure with the low stage side rotary compressing mechanism 4 and discharged to the closed housing 3 and an intermediate pressure refrigerant gas injected from the gas injection circuit 15 to the closed housing 3 are mixed in the closed housing 34 and suctioned to the pair of compression chambers 5 through a suction port 60. The pair of compression chambers 54 are reduced in capacity, moved to the center, and combined into one compression chamber 54 in accordance with the orbiting motion of the orbiting scroll 53. During this operation, the refrigerant gas is compressed from an intermediate pressure to a high pressure (discharge pressure), and discharged into the discharge chamber 58 from the center of the fixed scroll 52 through the discharge valve 57. The high-temperature and high-pressure refrigerant gas is discharged through the discharge pipe 6 from the multistage compressor 2.

Further, the high stage side scroll compressing mechanism 5 is provided with a capacity control mechanism 61. The capacity control mechanism 61 extracts the intermediate pressure refrigerant gas that is being compressed, from the compression chamber 54 to bypass the gas to the closed housing 3 on a suction side of the high stage side scroll compressing mechanism 5. As shown in FIG. 2, the capacity control mechanism 61 includes a capacity control block 62 provided between the rear side of the fixed scroll 52 and the discharge cover 59. The capacity control block 62 is provided with a ring-shaped capacity control chamber 65 communicating with a bypass port 63 provided in a fixed scroll 52 through a check valve 64. The capacity control chamber 65 communicates with a ring-shaped communication chamber 67 formed in the discharge cover 59 through a communication hole 66.

The communication chamber 67 is connected to one end of a bypass pipe 68 that protrudes from the closed housing 3. As shown in FIG. 1, a three-way selector valve 69 is provided at the other end of the bypass pipe 68 outside the closed housing 3. One selector port of the three-way selector valve 69 is connected to an intermediate pressure atmosphere in the closed housing 3 through the bypass pipe 70, and the other selector port thereof is connected to the discharge pipe 6 of the multistage compressor 2 through a high-pressure induction tube 71.

With the above structure, owing to the three-way selector valve 69, if the bypass pipe 68 communicates with the high-pressure induction tube 71, a discharge pressure (high pressure) is applied to the capacity control chamber 65, and the check valve 64 closes the bypass port 63 to thereby turn off the capacity control mechanism 61. On the other hand, owing to the three-way selector valve 69, if the bypass pipe 68 communicates with the bypass pipe 70, the capacity control chamber 65 is kept at an intermediate pressure as in the closed housing 3, so a refrigerant gas that is being compressed bursts the check valve 64 open to flow into the capacity control chamber 65. The refrigerant gas, which is not compressed, is bypassed from the capacity control chamber 65 to the closed housing 3 through the communication hole 66, the communication chamber 67, the bypass pipe 68, the three-way selector valve 69, and the bypass pipe 70. A compressed capacity is thereby reduced.

A capacity control rate of the capacity control mechanism 61 can be arbitrarily set by selecting an appropriate position of the bypass port 63. Consider the case where the gas injection circuit 15 is turned off to control a capacity with the capacity control mechanism 61. In this embodiment, a capacity control rate in this case is set so as to correspond to pressure ratio distribution obtained when the gas injection circuit 15 is turned on, that is, the capacity control mechanism 61 is turned off upon gas injection, that is, at the full capacity. In other words, a capacity control rate is set such that a pressure ratio of the low stage side compressing mechanism 4 is equal to that of the high stage side compressing mechanism 5 regardless of whether or not the gas injection is stopped. As a result, an intermediate pressure can be kept appropriately regardless of whether or not the gas injection is stopped.

Further, in this embodiment, the gas injection circuit 15 is provided with an electromagnetic on/off valve (on/off mechanism) 75, and the electromagnetic on/off valve 75 is opened/closed to thereby turn on/off the gas injection circuit. The electromagnetic on/off valve 75 is opened/closed in step with an operation of the three-way selector valve 69 under the control of a control unit 76. The control unit 76 opens the electromagnetic on/off valve 75 to turn on the gas injection circuit 15 to allow gas injection as well as switches the three-way selector valve 69 to the high-pressure induction tube 71 side to turn off the capacity control mechanism 61 under normal operating conditions. Further, under the condition not requiring a high capacity, the control unit closes the electromagnetic on/off valve 75 to stop (cancel) gas injection of the gas injection circuit 15 as well as switches the three-way selector valve 69 to let the bypass pipe 68 and the bypass pipe 70 communicate with each other to allow capacity control of the capacity control mechanism 61, that is, turn on the capacity control mechanism in accordance with input signals 77 regarding an ambient temperature, room temperature, air conditioning load, and an air conditioner operation mode.

Operations of the refrigeration cycle 1 and multistage compressor 2 are described next.

In the low stage side rotary compressing mechanism 4 of the multistage compressor 2, a low-pressure refrigerant gas is directly suctioned into the cylinder chamber 41 from the accumulator 30 through the suction tube 47. The refrigerant gas is compressed down to an intermediate pressure in accordance with the rotation of the rotor 44 through the electric motor 31 and crank shaft 35 and then discharged to the discharge cavity 45 and further discharged to the closed housing 3 from a discharge port formed in the discharge cover 46 from the discharge cavity 45. As a result, an internal atmosphere of the closed housing 3 is kept at an intermediate pressure, and the electric motor 31 and the lubricating oil 37 are kept at temperature almost equal to that of the intermediate pressure refrigerant. In the intermediate pressure atmosphere of the closed housing 3, an intermediate pressure refrigerant gas separated with the gas-liquid separator 10 is injected through the gas injection circuit 15.

The intermediate pressure refrigerant gas is mixed inside the closed housing 3 and suctioned into the compression chamber 54 of the high stage side scroll compressing mechanism 5 through the suction port 60 open in the closed housing 3. In the scroll compressing mechanism 5, the electric motor 31 is driven, and the orbiting scroll 53 is revolved with respect to the fixed scroll 52 through the crank shaft 36, the crank pin 36A, and the drive bushing 55 to thereby carry out compression. Thus, the intermediate pressure refrigerant gas is compressed to a high pressure and discharged through the discharge valve 57 to the discharge chamber 58.

The high-temperature and high-pressure refrigerant gas discharged to the discharge chamber 58 is discharged through the discharge pipe 6 connected to the discharge chamber 58 from the multistage compressor 2 and introduced to the radiator 7 as indicated by the solid-line arrow of FIG. 1. The refrigerant gas is heat-exchanged with an air supplied with a radiator fan by the radiator 7 to radiate heat to the air and thus turned into a supercritical state or condensed liquid state. The refrigerant is decompressed with the first decompression valve 9 through the refrigerant pipe 8 and turned into a gas-liquid two-phase state, and supplied to the gas-liquid separator 10 and then separated into an intermediate pressure liquid refrigerant and an intermediate gas refrigerant. The separated intermediate gas refrigerant is injected to the closed housing 3 through the gas injection circuit 15 as described above. On the other hand, the intermediate pressure liquid refrigerant is decompressed again with the second decompression valve 12 through the refrigerant pipe 11 and turned into a low-pressure gas-liquid two-phase refrigerant and then supplied to the evaporator 13.

The low-pressure and low-temperature gas-liquid two-phase refrigerant supplied to the evaporator 13 is heat-exchanged with an air supplied with an evaporator fan while circulating in the evaporator 13, and absorbs heat of the air to turn into an evaporating gas. The low-pressure refrigerant gas is guided to the accumulator 30 integrally provided to the multistage compressor 2 through the suction pipe 14. Then, a liquid component is separated from the gas, and only a gas component is suctioned into the low stage side rotary compressing mechanism 4 through the suction tube 47 and compressed again.

While the above cycle is repeated, air-heating or heating can be executed based on heat radiation of the radiator 7 and air-cooling or cooling can be executed based on heat adsorption of the evaporator 13.

During this operation, in the multistage compressor 2, the lubricating oil 37 filled in the closed housing 3 is supplied to predetermined portions of the low stage side rotary compressing mechanism 4 and high stage side scroll compressing mechanism 5 by the positive-displacement oil pump 20 through the oil supply hole 21 to thereby securely lubricate sliding portions of both the compressing mechanisms 4 and 5. That is, the lubricating oil 37 in the closed housing 3 can be supplied to the high stage side scroll compressing mechanism 5 unfailingly due to a high oil feeding ability of the positive-displacement oil pump 20 even through differential-pressure lubrication for the mechanism 5 is very difficult. Thus, the low stage side and high stage side compressing mechanisms 4 and 5 can be stably lubricated.

Further, upon air heating or heating, a refrigerant flowing through the radiator 7 is added with an intermediate pressure refrigerant due to gas injection, so a refrigerant circulation amount is increased and an air-heating or heating capacity thereof is accordingly improved. Further, upon air cooling or cooling, enthalpy of the refrigerant is increased due to an economizer effect of the gas-liquid separator 9, so heat quantity of the refrigerant evaporated with the evaporator 13 is increased and an air-cooling or cooling capacity is accordingly increased. Moreover, in the multistage compressor 2, a power necessary for compressing the refrigerant is considerably saved due to an effect of gas injection.

On the other hand, during a mild-weather season such as the spring or autumn, an air-conditioning load is low, so a high air-conditioning power is not necessarily required. Under such operating conditions, it is unnecessary to enhance its capacity through gas injection. If the control unit 76 determines to stop gas injection based on the input signal 77, the electromagnetic on/off valve 75 is closed to turn off the gas injection circuit 15 to cancel the gas injection. At the same time, the control unit 76 switches the three-way selector valve 69 to let the bypass pipe 68 and the bypass pipe 70 communicate with each other. Thus, the capacity control mechanism 61 is turned into a capacity control state, that is, turned on. As the gas injection is stopped, displacement volume of the high pressure side scroll compressing mechanism 5 is reduced so as to correspond to a preset capacity control rate. In this way, compression ratios of the low stage side and high stage side compressing mechanisms are adjusted to keep an intermediate pressure to an appropriate value.

According to the above embodiment, the following advantages can be obtained.

If the gas injection circuit 15 is turned on/off in accordance with operating conditions, the capacity control mechanism 61 changes apparent displacement volume of the high stage side scroll compressing mechanism 5 to adjust compression ratios in each stage to keep an intermediate pressure at an appropriate value. Therefore, an optimum compression ratio never varies in accordance with on/off operations of the gas injection circuit 15, and the compressor can operate with high efficiency and high capacity all the time.

Further, the control unit 76 controls the electromagnetic on/off valve 75 to turn off the gas injection circuit 15 as well as controls the three-way selector valve 69 to control a capacity. Thus, under low-load conditions, capacity control can be securely performed in step with turn-off of the gas injection circuit. Therefore, a power of the multistage compressor 2 can be further saved through capacity control.

Further, an internal portion of the closed housing 3 is set to an intermediate pressure atmosphere due to an intermediate pressure refrigerant gas discharged from the low stage side compressing mechanism 4, an intermediate pressure refrigerant gas injected from the gas injection circuit 15, and an intermediate pressure refrigerant gas bypassed from the capacity control mechanism 61. If the gas injection is stopped, a corresponding amount of intermediate pressure refrigerant gas is bypassed from the capacity control mechanism 61, so the internal portion of the closed housing 3 can be always kept at an appropriate intermediate pressure. Hence, it is possible to suppress change in intermediate pressure in the closed housing 3 and enable stable two-stage compression.

Moreover, the high stage side compressing mechanism is the scroll compressing mechanism 5, so the capacity control mechanism 61 can be easily incorporated compared with the rotary compressing mechanism from a structural point of view, and in addition, a lubricating structure can be simplified. Therefore, a multistage compressor including a gas injection circuit can be produced at low costs.

Second Embodiment

Next, a second embodiment of the present invention is described with reference to FIG. 3.

This embodiment is the same as the first embodiment except that a forced load operation function executed at startup is added. Thus, repetitive description thereof is omitted.

In this embodiment, as shown in FIG. 3, the capacity control mechanism 61 and the gas injection circuit 15 are forcedly turned on/off at the startup irrespective of air-conditioning load etc.

That is, at the startup, the three-way selector valve 69 is first switched to let the bypass pipe 68 and the bypass pipe 70 communicate with each other to turn on the capacity control mechanism 61. In addition, the electromagnetic on/off valve 75 is closed to turn off the gas injection circuit 15. This is to prevent a liquid refrigerant from flowing back from the refrigeration cycle 1 to the multistage compressor 2 through the gas injection circuit 15 and to gradually discharge a liquid refrigerant accumulated in the closed housing 3 during halts to prevent excessive liquid compression.

The startup operation is continued for preset time, for example, more than ten seconds under the low-load condition based on capacity control, and almost all liquid refrigerant is discharged and prevented to flow back, after which the electromagnetic on/off valve 75 is opened to turn on the gas injection circuit 15 to start gas injection. In this state, a shift operation is continued for preset time, for example, several seconds to completely discharge the liquid refrigerant, after which the capacity control mechanism 61 is turned off to stop capacity control and start gas injection. In this way, the operation is shifted to a full-load operation.

According to the above structure of this embodiment, it is possible to prevent a liquid refrigerant from flowing back from the gas injection circuit 15 at the startup and to shift the operation to a two-stage compression operation with high efficiency and high capacity through general gas injection after a liquid refrigerant accumulated in the multistage compressor 2 during halts is completely discharged. Therefore, the multistage compressor 2 can be protected from excessive liquid compression and enhance its reliability.

Third Embodiment

Next, a third embodiment of the present invention is described with reference to FIG. 1.

This embodiment is the same as the first embodiment except that a liquid flowback protective function is added. A repetitive description thereof is omitted here.

This embodiment is directed to detect a so-called liquid flowback operation that a liquid refrigerant flows back to the multistage compressor 2 from the suction pipe 14 under a certain operating condition, and prevent the liquid flowback operation.

In some cases, a liquid refrigerant flows back to the multistage compressor 2 due to rapid change in load or excessive increase in power. Such a liquid flowback operation can be detected by determining how much a suctioned refrigerant is heated in accordance with detected values of a low-pressure sensor 78 and a suctioned refrigerant temperature sensor 79 provided to the suction pipe 14 of the refrigeration cycle 1. In this embodiment, when the control unit 76 detects the liquid flowback operation, the unit forcedly turns on the capacity control mechanism 61 and turns off the gas injection circuit 15 to switch the multistage compressor 2 to a low-capacity and low-power operation.

In this way, during the liquid flowback operation, the capacity control mechanism 61 is turned on and the gas injection circuit 15 is turned off to switch the multistage compressor 2 to a low-capacity and low-power operation to prevent the liquid flowback operation.

Therefore, it is possible to avoid liquid compression that might accompany the liquid flowback operation, and prevent the multistage compressor 2 from being damaged due to liquid compression.

Fourth Embodiment

Next, a fourth embodiment of the present invention is described with reference to FIG. 4.

This embodiment is the same as the first and third embodiments except that a liquid injection system is adopted. Thus, a repetitive description thereof is omitted here.

Figure 4:
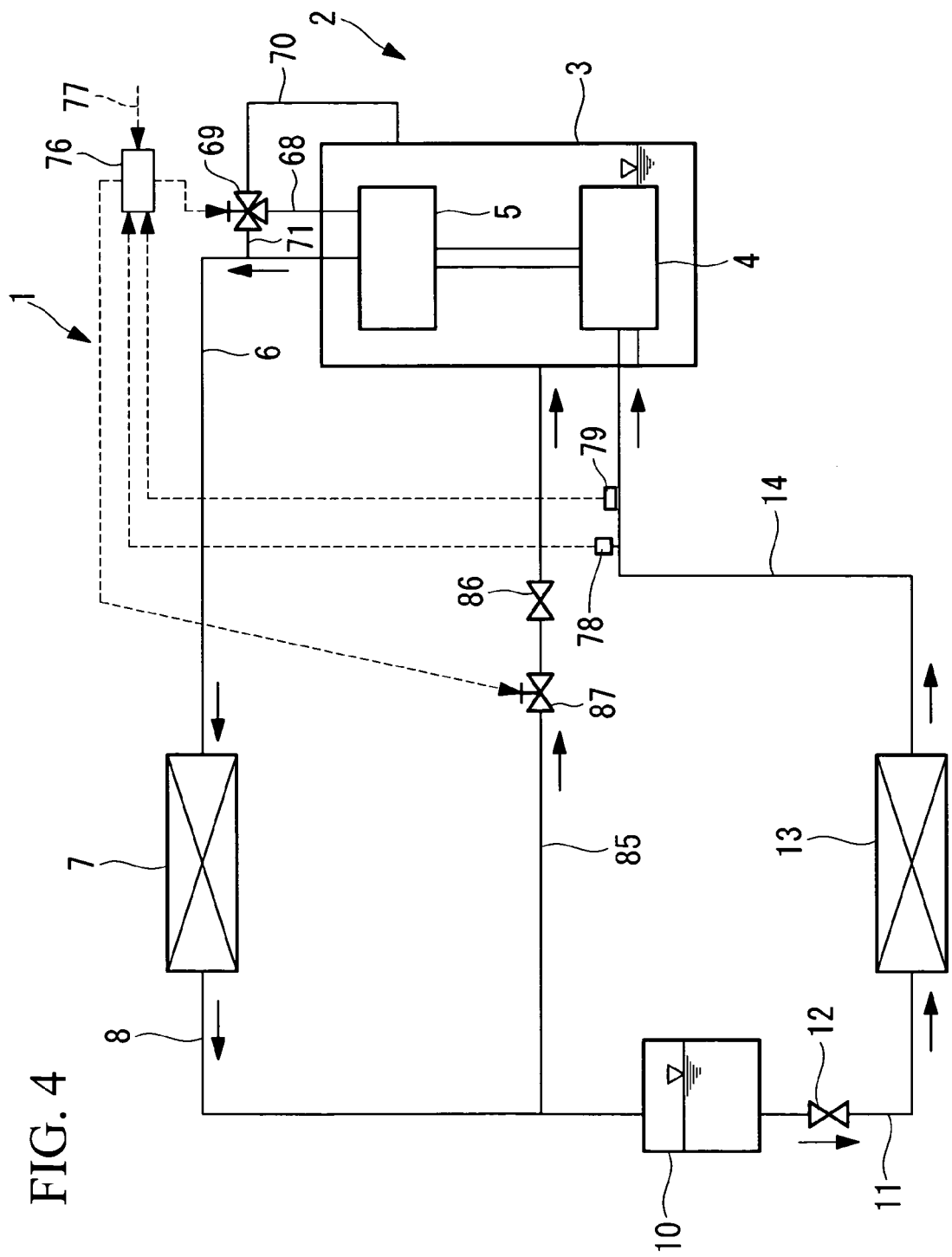
FIG. 4 is a diagram of a refrigeration cycle with a multistage compressor according to a fourth embodiment of the present invention.

In this embodiment, a liquid injection circuit 85 including a decompression valve 86 as shown in FIG. 4 is provided in place of the gas injection circuit 15 of the first embodiment as shown in FIG. 1, and an electromagnetic on/off valve (on/off mechanism) 87 as a means for controlling (on/off) liquid injection is provided to the injection circuit 85. The liquid injection circuit 85 can be directly branched off from the refrigerant pipe 8 on the downstream side of the radiator 7. In this case, the first decompression valve 9 can be omitted and the gas-liquid separator 10 may be a receiver (liquid receiver) having no liquid-gas separation function.

As described above, also in the case of using the liquid injection circuit 85 in place of the gas injection circuit 15, advantages almost similar to those of gas injection can be obtained.

In particular, in the case of injecting a liquid refrigerant, a cooling effect of the liquid refrigerant can be expected, so a discharged refrigerant gas temperature can be decreased during an operation with a high pressure ratio (high-power operation) or a motor efficiency can be increased through cooling of the electric motor 31.

The present invention is not limited to the above embodiments but may be modified as appropriate without departing from the scope of the present invention.

For example, as for the gas injection system, an internal heat exchange may be used in place of the gas-liquid separator. Further, the multistage compressor of the present invention is not limited to the refrigeration cycle using an HFC refrigerant but is applicable to a using supercritical refrigeration cycle ($CO_2$ cycle) using a $CO_2$ refrigerant.

What is claimed is:

1. A multistage compressor, comprising:
a low stage side compressing mechanism and a high stage side compressing mechanism provided in a housing with the low stage side compressing mechanism compressing an intermediate pressure refrigerant gas and the high stage side compressing mechanism suctioning the compressed intermediate pressure refrigerant gas to perform two-stage compression; and
an injection circuit for injecting an intermediate pressure refrigerant extracted from a refrigerant circuit into the intermediate pressure refrigerant gas suctioned to the high stage side compressing mechanism,
the high stage side compressing mechanism including a capacity control mechanism for bypassing a refrigerant gas that is being compressed to a suction side,
the injection circuit including an on/off mechanism for performing on/off control of refrigerant injection, and
the capacity control mechanism and the on/off mechanism being operated in conjunction with each other.

2. The multistage compressor according to claim 1, wherein if the on/off mechanism turns off the injection circuit, the capacity control mechanism controls a capacity of the high stage side compressing mechanism.

3. The multistage compressor according to claim 2, wherein a capacity control rate of the capacity control mechanism at least under a condition that the on/off mechanism turns off the injection circuit is set to correspond to pressure ratio distribution obtained when the injection circuit is turned on with a full capacity.

4. The multistage compressor according to claim 1, wherein the capacity control mechanism is forcedly turned on and the injection circuit is forcedly turned off at startup.

5. The multistage compressor according to claim 4, wherein after the startup, the capacity control mechanism is turned on and the injection circuit is turned on, and then an operation is shifted to a full-load operation in which the capacity control mechanism is turned off and the injection circuit is turned on.

6. The multistage compressor according to claim 1, wherein during a liquid flowback operation, the capacity control mechanism is forcedly turned on and the injection circuit is forcedly turned off.

7. The multistage compressor according to claim 1, wherein the housing is an intermediate pressure housing in which an intermediate pressure refrigerant gas compressed with the low stage side compressing mechanism is discharged, an intermediate pressure refrigerant is injected from the injection circuit, and an intermediate pressure refrigerant gas is bypassed from the capacity control mechanism.

8. The multistage compressor according to claim 1, wherein the high stage side compressing mechanism is a scroll compressing mechanism.

* * * * *